(12) United States Patent
Ju et al.

(10) Patent No.: US 11,467,679 B2
(45) Date of Patent: Oct. 11, 2022

(54) TOUCH SCREEN DEVICE

(71) Applicant: LG DISPLAY CO., LTD., Seoul (KR)

(72) Inventors: Suyun Ju, Gangwon-do (KR);
SungChul Kim, Goyang-si (KR);
SangHyuck Bae, Paju-si (KR); Sungsu Han, Goyang-si (KR); DoYoung Jung, Seoul (KR)

(73) Assignee: LG DISPLAY CO, LTD., Seoul (KR)

( * ) Notice: Subject to any disclaimer, the term of this patent is extended or adjusted under 35 U.S.C. 154(b) by 707 days.

(21) Appl. No.: 14/959,337

(22) Filed: Dec. 4, 2015

(65) Prior Publication Data
US 2016/0188005 A1  Jun. 30, 2016

(30) Foreign Application Priority Data

Dec. 31, 2014  (KR) .......................... 10-2014-0196043

(51) Int. Cl.
| | | |
|---|---|---|
| *G06F 3/038* | (2013.01) | |
| *G06F 3/0354* | (2013.01) | |
| *G06F 3/041* | (2006.01) | |
| *G06F 3/044* | (2006.01) | |

(52) U.S. Cl.
CPC ............ *G06F 3/0383* (2013.01); *G06F 3/038* (2013.01); *G06F 3/03545* (2013.01); *G06F 3/0412* (2013.01); *G06F 3/0441* (2019.05); *G06F 3/0442* (2019.05); *G06F 3/04162* (2019.05)

(58) Field of Classification Search
CPC .......................... G06K 7/10544; G06K 9/222; G06F 3/03542; G06F 3/03545; G06F 3/03546
See application file for complete search history.

(56) References Cited

U.S. PATENT DOCUMENTS

| | | | | |
|---|---|---|---|---|
| 2013/0106722 A1* | 5/2013 | Shahparnia | ......... | G06F 3/03545 345/173 |
| 2013/0169582 A1 | 7/2013 | Ryshtun | | |
| 2014/0176495 A1* | 6/2014 | Vlasov | ................ | G06F 3/03545 345/174 |
| 2014/0375599 A1* | 12/2014 | Mao | .................... | G06F 3/03545 345/174 |

(Continued)

FOREIGN PATENT DOCUMENTS

| | | |
|---|---|---|
| CN | 102866792 A | 1/2013 |
| CN | 103186302 A | 7/2013 |

(Continued)

*Primary Examiner* — William Boddie
*Assistant Examiner* — Jeffrey Parker
(74) *Attorney, Agent, or Firm* — Dentons US LLP (57) ABSTRACT

Disclosed is a touch screen device for transmitting button manipulation information based on a touch pen without using a separate wireless communication module. The touch screen device includes a touch screen including a plurality of touch electrodes, a touch driving circuit applying a touch electrode driving signal to the plurality of touch electrodes, and a touch pen receiving the touch electrode driving signal applied to the plurality of touch electrodes and transmitting a pen output signal to the touch screen in response to the received touch electrode driving signal. The touch pen includes at least one button, and when a user manipulates the at least one button, the touch pen adjusts the pen output signal.

18 Claims, 9 Drawing Sheets

(56) References Cited

U.S. PATENT DOCUMENTS

| | | | | |
|---|---|---|---|---|
| 2015/0054797 A1* | 2/2015 | Takahashi | ........... | G06F 3/03545 345/179 |
| 2015/0193025 A1* | 7/2015 | Rebeschi | ............ | G06F 3/03545 345/174 |
| 2015/0193033 A1* | 7/2015 | Westhues | .............. | G06F 3/0412 345/173 |

FOREIGN PATENT DOCUMENTS

| | | |
|---|---|---|
| CN | 103488316 A | 1/2014 |
| CN | 103645813 A | 3/2014 |
| CN | 203502948 U | 3/2014 |
| CN | 103729073 A | 4/2014 |
| JP | H10-149253 A | 6/1998 |
| KR | 10-2014-0083214 A | 7/2014 |
| KR | 10-2014-0085995 A | 7/2014 |
| KR | 10-2014-0105216 A | 9/2014 |

\* cited by examiner

TOUCH SCREEN DEVICE

CROSS-REFERENCE TO RELATED APPLICATIONS

This application claims the benefit of the Korean Patent Application No. 10-2014-0196043 filed on Dec. 31, 2014 which is hereby incorporated by reference for all purposes as if fully set forth herein.

BACKGROUND

Field of the Invention

The present invention relates to a touch screen device. More particularly, the invention relates to a touch screen device for transmitting button manipulation information based on a touch pen without using a separate wireless communication module.

Discussion of the Related Art

Examples of flat panel display devices, which display an image by using digital data, include liquid crystal display (LCD) devices using liquid crystal, plasma display panels (PDPs) using discharging of an inert gas, organic light emitting diode (OLED) display devices using OLEDs, etc.

Recently, touch screen devices which are each implemented with a touch panel added to a flat panel display device are being produced. Examples of the touch screen devices include smartphones, smart books, etc. In the touch screen devices, writing or drawing may be performed by using a touch pen as well as a human touch performed by a finger. A touch input using the touch pen is more precise than an input corresponding to the human touch and thus enables precise writing and drawing to be easily performed.

In a related art touch screen device, a plurality of electrodes or sensors are separately provided in a touch panel so as to recognize a touch performed by a touch pen. Particularly, when a touch panel is implemented as one body with a display panel, a plurality of electrodes and sensors are further provided, and for this reason, a manufacturing process becomes complicated, and the manufacturing cost increases.

Moreover, the related art touch screen device provides a function where a user manipulates a button included in the touch pen to control the touch screen. However, since a touch pen of the related art includes a separate wireless communication module for transmitting button manipulation information, the touch pen of the related art is complicated in structure, and the manufacturing cost increases.

SUMMARY

Accordingly, the present invention is directed to provide a touch screen device that substantially obviates one or more problems due to limitations and disadvantages of the related art.

An aspect of the present invention is directed to provide a touch screen device that accurately detects a touch performed by a touch pen even without a separate sensor being provided in a touch panel and transmits button manipulation information based on the touch pen even without using a separate wireless communication module.

In addition to the aforesaid objects of the present invention, other features and advantages of the present invention will be described below, but will be clearly understood by those skilled in the art from descriptions below.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, there is provided a touch screen device including a touch screen including a plurality of touch electrodes, a touch driving circuit applying a touch electrode driving signal to the plurality of touch electrodes, and a touch pen receiving the touch electrode driving signal applied to the plurality of touch electrodes and transmitting a pen output signal to the touch screen in response to the received touch electrode driving signal, wherein the touch pen includes at least one button, and when a user manipulates the at least one button, the touch pen adjusts the pen output signal.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Reference will now be made in detail to the exemplary embodiments of the present invention, examples of which are illustrated in the accompanying drawings. Wherever possible, the same reference numbers will be used throughout the drawings to refer to the same or like parts.

The terms described in the specification should be understood as follows. As used herein, the singular forms "a", "an" and "the" are intended to include the plural forms as well, unless the context clearly indicates otherwise. The terms "first" and "second" are for differentiating one element from the other element, and these elements should not be limited by these terms. It will be further understood that the terms "comprises", "comprising", "has", "having", "includes" and/or "including", when used herein, specify the presence of stated features, integers, steps, operations, elements, and/or components, but do not preclude the presence or addition of one or more other features, integers, steps, operations, elements, components, and/or groups thereof. The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item. The term "on" should be construed as including a case where one element is formed at a top of another element and moreover a case where a third element is disposed therebetween.

Hereinafter, an example of a touch screen device according to an embodiment of the present invention will be described in detail with reference to the accompanying drawings.

Figure 1:
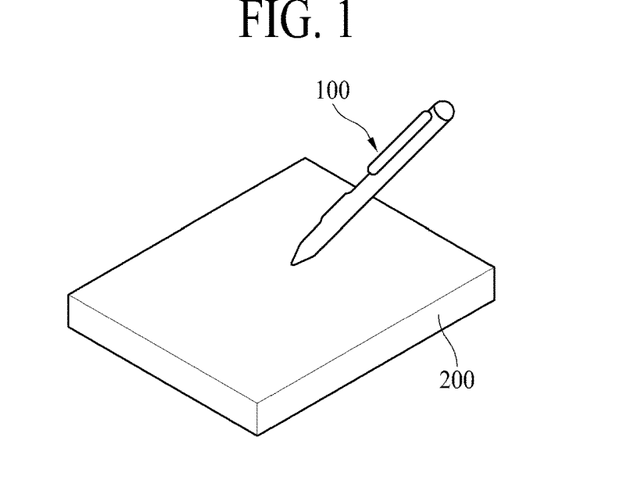
FIG. 1 is a diagram schematically illustrating a configuration of a touch screen device according to an embodiment of the present invention.

FIG. 1 is a diagram schematically illustrating a configuration of a touch screen device according to an embodiment of the present invention.

Referring to FIG. 1, the touch screen device according to an embodiment of the present invention may include a display panel 200, which has a display function and a detection function, and a touch pen 100 that performs a touch detection function according to a specific area being touched.

The display panel 200 may detect a touch which is performed by a finger in addition to the touch pen 100, and may include a capacitive touch screen integrated into the display panel 200. The touch screen may include a touch electrode (or a touch line) which is disposed on a glass substrate and is a separate element. Also, the touch screen may be implemented in an in-cell type where a touch detection electrode and a connection line thereof are formed in a process of forming a pixel array which is used for the display panel 200 to display a screen. In the in-cell type, a supporting substrate may be omitted, and thus, the finished display panel 200 may have the almost same thickness and weight as those of a display panel having an original screen display function.

The display panel 200 may be one of a liquid crystal panel, a field emission display panel, a plasma display panel, an OLED display panel, an electrophoresis display panel, etc. In embodiments to be described below, the liquid crystal panel will be described. When the display panel 200 is implemented as the liquid crystal panel, a plurality of electrodes configuring a touch screen may be formed simultaneously with a process of forming a line of the liquid crystal panel.

According to the embodiments of the present invention, a conductive tip of the touch pen may be used as an element that receives a touch electrode driving signal of the touch screen. Also, the conductive tip may be used as an element that transmits a pen output signal generated in the touch pen. Also, the touch pen may output the pen output signal in synchronization with the touch electrode driving signal of the touch screen which is received by the touch pen.

Therefore, according to the embodiments of the present invention, whether a touch is performed by the touch pen is accurately detected in the driving period of the touch screen, and thus, an accuracy of touch detection increases. Accordingly, it is possible to implement a high-sensitivity input pen. Also, a linearity of touch detection is maintained, and thus, touch performance is enhanced. Also, although a separate electrode for driving the touch pen is not added into the display panel, a high sensation of touch sensing is maintained, and thus, a structure is simplified.

The touch pen according to an embodiment of the present invention will be described below with reference to FIGS. 7 to 10.

Figure 2:
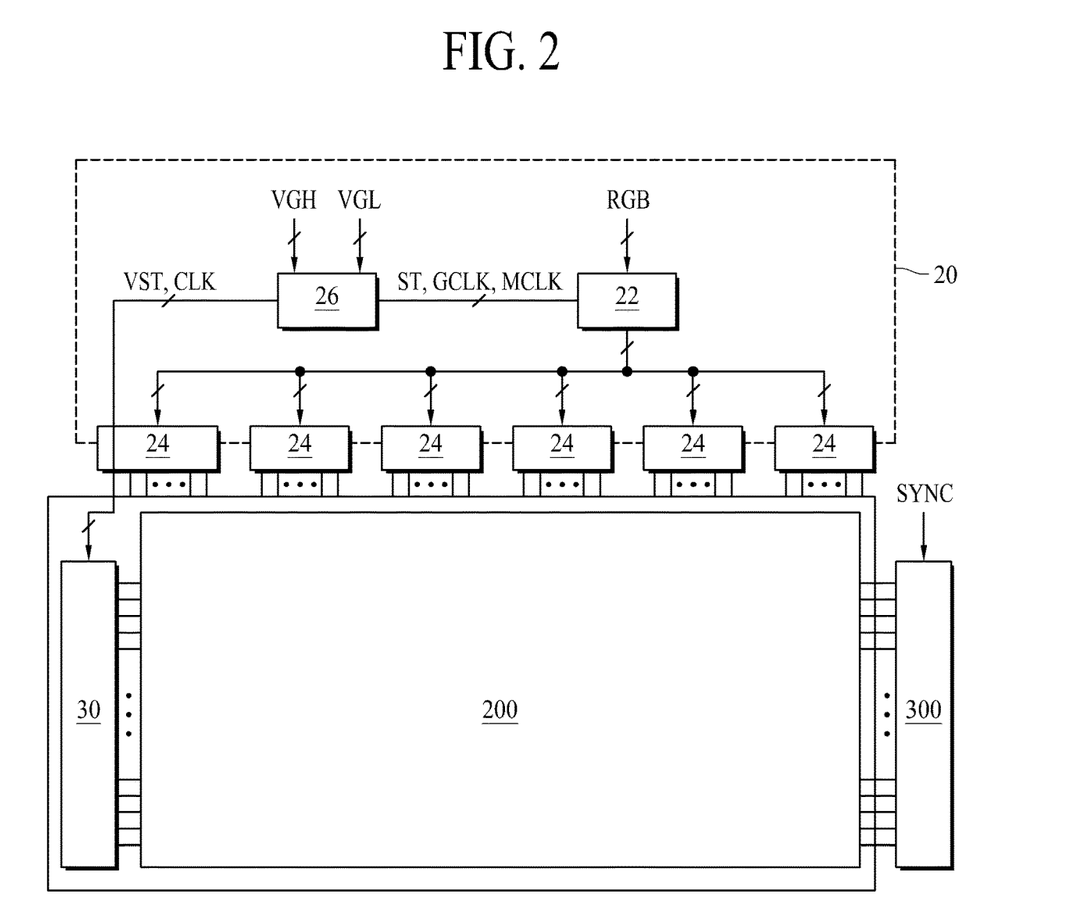
FIG. 2 is a block diagram illustrating a display panel of the touch screen device according to an embodiment of the present invention and a controller thereof.

FIG. 2 is a block diagram illustrating a display panel of the touch screen device according to an embodiment of the present invention and a controller thereof.

Referring to FIG. 2, the display panel 200 of the touch screen device according to an embodiment of the present invention may be connected to a gate driving circuit 26 (30) and a data driving circuit 24 which are included in a pixel array driving circuit. Also, the display panel 200 may be connected to a touch driving circuit 300 that is a touch screen driving circuit. The pixel array driving circuit and the touch screen driving circuit may be connected to a timing controller 22 and may be integrated into a single module (not shown).

When the display panel 200 is the liquid crystal panel, the display panel 200 may include a liquid crystal layer disposed between two substrates. The substrates may each be manufactured as a glass substrate, a plastic substrate, a film substrate, or the like. A pixel array disposed on a lower substrate of the display panel 200 may include a plurality of data lines, a plurality of gate lines intersecting the data lines, and a plurality of pixels which are arranged in a matrix type. The pixel array may further include a plurality of thin film transistors (TFTs) which are respectively formed in the plurality of pixels defined by intersections of the data lines and the gate lines, a plurality of pixel electrodes for respectively charging the plurality of pixels with data voltages, and a plurality of storage capacitors which are respectively connected to the plurality of pixel electrodes to hold respective pixel voltages.

The pixels of the display panel 200 may be respectively provided in a plurality of pixel areas defined by the data lines (D1 to Dm) and the gate lines (G1 to Gn) and may be arranged in the matrix type. A liquid crystal cell of each of the pixels may adjust a transmission amount of incident light according to a voltage difference between a data voltage applied to a corresponding pixel electrode and a common voltage applied to a corresponding common electrode. Each of the TFTs may be turned on in response to a gate pulse supplied through a corresponding gate line and may supply a data voltage, supplied through a corresponding data line, to a pixel electrode of a corresponding liquid crystal cell. The common electrode may be disposed on a lower substrate or an upper substrate.

The upper substrate of the display panel 200 may include a black matrix, a color filter, etc. A polarizer may be attached to each of the upper substrate and the lower substrate of the display panel 200, and an alignment layer for adjusting a pre-tilt angle of liquid crystal may be disposed on an inner surface contacting the liquid crystal. A spacer for maintaining a cell gap of the liquid crystal cell may be disposed between the upper substrate and the lower substrate of the display panel 200.

The display panel 200 may be implemented in a well-known liquid crystal mode such as a twisted nematic (TN) mode, a vertical alignment (VA) mode, an in-plane switching (IPS) mode, a fringe field switching (FFS) mode, or the like.

A backlight unit may be optionally disposed on a rear surface of the display panel 200. The backlight unit may be implemented as an edge type backlight unit or a direct type backlight unit and may irradiate light onto the display panel 200.

The data driving circuit 24 may convert digital video data RGB, input from the timing controller 22, into analog positive/negative gamma compensation voltages to generate data voltages. The data driving circuit 24 may respectively supply the data voltages to the data lines according to control by the timing controller 22 and may invert polarities of the data voltages.

The gate driving circuit 26 (30) may sequentially supply the gate pulse (or a scan pulse), synchronized with the data voltages, to the gate lines to select lines of the display panel 200 in which the data voltages are respectively written. The gate driving circuit 26 (30) may include a level shifter 26 and a shift register 30. The shift register 30 may be directly provided on the substrate of the display panel 200 in a gate-in panel (GIP) type.

The level shifter 26 may be provided on a printed circuit board (PCB) 20 electrically connected to the lower substrate of the display panel 200. The level shifter 26 may output clock signals that swing between a gate high voltage VGH and a gate low voltage VGL according to control by the timing controller 22. The gate high voltage VGH may be set as a voltage equal to or higher than a threshold voltage of a thin film transistor (TFT) which is formed in the pixel array of the display panel 200. The gate low voltage VGL may be set as a voltage lower than the threshold voltage of the TFT which is formed in the pixel array of the display panel 200. The level shifter 26 may output a start pulse VST and a clock signal CLK which swing between the gate high voltage VGH and the gate low voltage VGL in response to a reference start signal ST, a first clock GCLK, and a second clock MCLK which are input from the timing controller 22. Phases of the clock signals CLK output from the level shifter 26 may be sequentially shifted, and the phase-shifted clock signals CLK may be transferred to a shift register 30 which is provided in the display panel 200.

The shift register 30 may start to perform synchronization in response to the start pulse VST input from the level shifter 26, shift an output in response to the clock signals CLK, and sequentially supply the gate pulse to the gate lines of the display panel 200.

The timing controller 22 may supply digital video data RGB, input from an external host system, to a plurality of integrated circuits (ICs) included in the data driving circuit 24. The timing controller 22 may receive timing signals such as a vertical sync signal Vsync, a horizontal sync signal Hsync, a data enable signal DE, and a clock to generate a plurality of timing control signals for controlling operation timings of the data driving circuit 24 and the gate driving circuit 26 (30). The timing controller 22 or the host system may generate a sync signal SYNC for controlling operation timings of a pixel array driving circuit and the touch driving circuit 300.

The touch driving circuit 300 may apply the touch electrode driving signal to a plurality of touch electrodes (or lines) and may count a driving signal voltage change of after and before a touch is performed, or may count a rising or falling edge delay time of a driving signal, thereby sensing a capacitance change. The touch driving circuit 300 may convert sensing data, received from a capacitance of the touch screen, into digital data to output touch raw data. Also, the touch driving circuit 300 may execute a predetermined touch recognition algorithm and may analyze the touch raw data to detect a touch (or proximity) input.

Figure 3:
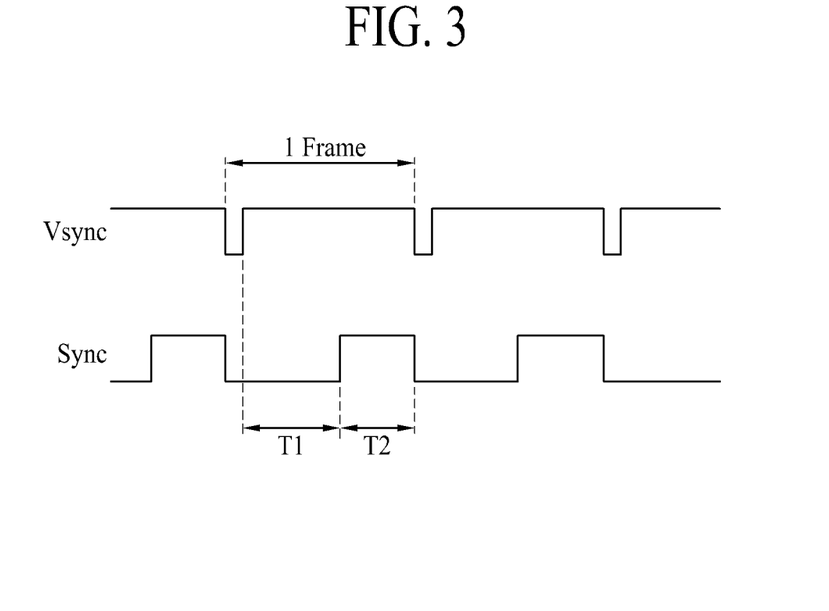
FIG. 3 is a waveform diagram showing time-division driving of the display panel included in the touch screen device according to an embodiment of the present invention.

FIG. 3 is a waveform diagram showing time-division driving of the display panel included in the touch screen device according to an embodiment of the present invention.

As shown in FIG. 3, the display panel 200 and the touch screen may be time-division driven. That is, one frame period may be time-divided into a pixel array driving period T1 and a touch screen driving period T2.

Vsync refers to a first vertical sync signal which is input to the timing controller 22, and SYNC refers to a second vertical sync signal which is input to the touch driving circuit 300. The timing controller 22 may modulate the first vertical sync signal Vsync input from the host system to generate the second vertical sync signal SYNC, for defining the pixel array driving period T1 and the touch screen driving period T2 in one frame period. Alternatively, the host system may generate the second vertical sync signal SYNC, and the timing controller 22 may control the pixel array driving period T1 and the touch screen driving period T2 in response to the second vertical sync signal SYNC input from the host system. That is, one of the timing controller 22 and the host system may time-divide the one frame period into the pixel array driving period T1 and the touch screen driving period T2 to control the operation timings of the pixel array driving circuit and the touch driving circuit.

For example, when it is assumed that the display panel 200 is driven at a frequency of 60 Hz, ¹⁄₆₀ sec may be one frame period, which may be divided into the pixel array driving period T1 and the touch screen driving period T2. As described above, the reason that pixel array driving and touch screen driving are time-division performed is because when the pixel array and the touch screen are driven at the same time, a displayed screen is not uniform due to severe driving interference therebetween, or an accuracy of touch detection is lowered.

During the pixel array driving period T1, the data driving circuit 24 may respectively supply data voltages to the data lines according to control by the timing controller 22, and the gate driving circuit 26 (30) may sequentially supply the gate pulse, synchronized with the data voltages, to the gate lines. The touch driving circuit 300 may not supply the touch electrode driving signal to the touch electrodes during the pixel array driving period T1.

Moreover, during the touch screen driving period T2, the pixel array driving circuit may not be driven, and the touch driving circuit 300 may be driven. Therefore, during the touch screen driving period T2, the touch driving circuit 300 may supply the touch electrode driving signal to the touch electrodes to detect a position of a touch (or proximity) input.

Figure 4A:
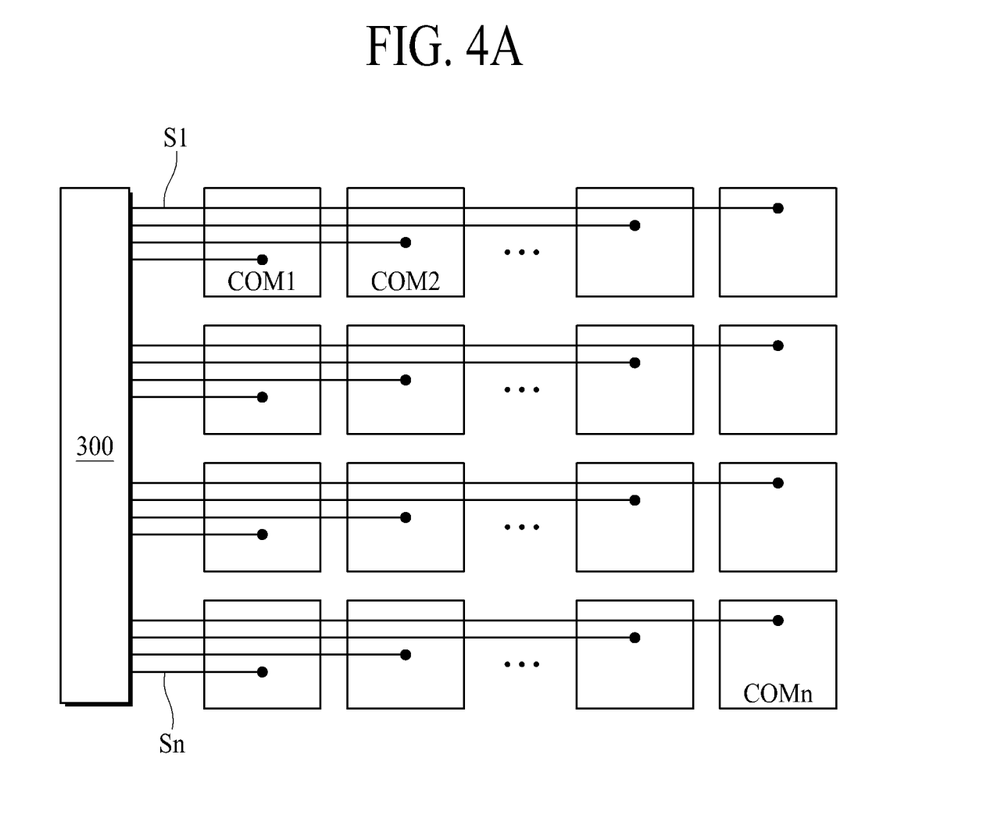
FIGS. 4A and 4B are block diagrams illustrating in detail a touch screen of the touch screen device according to an embodiment of the present invention and a touch controller thereof.
Figure 4B:
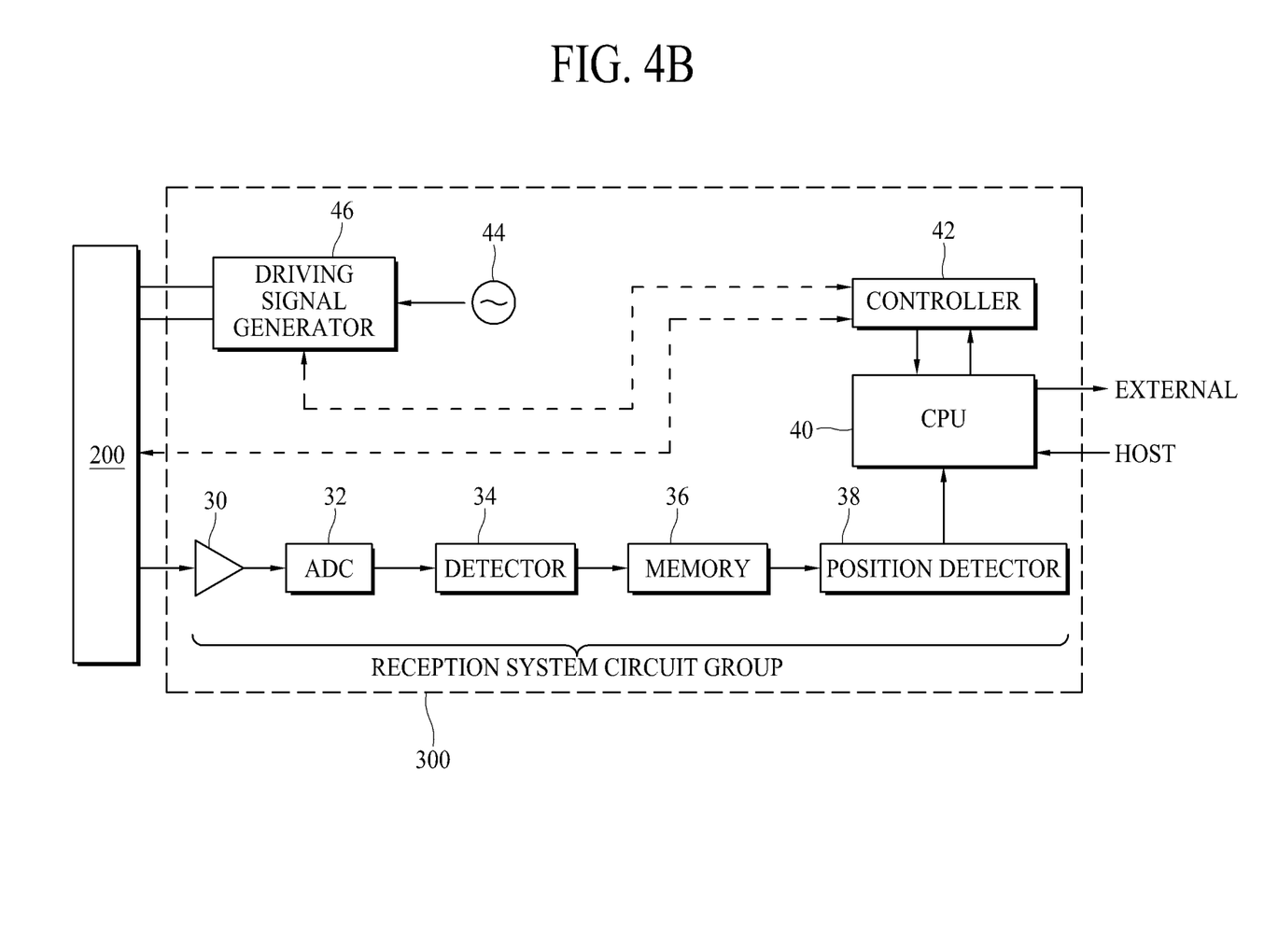

FIGS. 4A and 4B are block diagrams illustrating in detail a touch screen of the touch screen device according to an embodiment of the present invention and a touch controller thereof.

As illustrated in FIG. 4A, in the touch screen of the touch screen device according to an embodiment of the present invention, a plurality of touch electrodes COM1 to COMn for detecting a position of an input tool may be provided in the display panel 200 in an in-cell type.

For example, when the display panel 200 is a liquid crystal panel where a pixel array is included in a lower substrate and a color filter array is included in an upper substrate, the touch electrodes may be provided on the lower substrate along with the pixel array, or may be provided on the color filter array. Also, the touch electrodes may be used by patterning a common electrode which is formed on the lower substrate or the upper substrate. For example, if touch electrodes COM1 to COMn are formed by patterning the common electrode, a common voltage may be uniformly applied to the touch electrodes in order for the touch electrodes to act as the common electrode in pixel array driving.

The touch electrodes COM1 to COMn may be connected to a plurality of sensing lines S1 to Sn in one-to-one correspondence relationship, and the sensing lines S1 to Sn may be connected to the touch driving circuit 300.

The touch driving circuit 300, as illustrated in FIG. 4B, may include a reception system circuit group which includes a reception amplifier 30, an analog-to-digital conversion circuit 32, a detector 34, a memory 36, and a position calculator 38.

Moreover, the reception system circuit group may be connected to a central processing unit (CPU) 40 connected to an external host. Also, the CPU 40 may be connected to a controller 42 that overall controls a touch operation, and the controller 42 may be connected to a driving signal generator 46, whereby a touch electrode driving signal Ts generated by an oscillator 44 may be supplied to the touch electrodes COM1 to COMn through the sensing lines S1 to Sn.

A touch screen illustrated in the drawing may have a self-capacitance type, and the touch electrodes COM1 to COMn may be used for all of a driving signal applying operation and a reception signal detecting operation.

A size of each of the touch electrodes COM1 to COMn may be larger than that of each of a plurality of pixels, and for example, each of the touch electrodes COM1 to COMn may be formed in a size overlapping a plurality of pixels. Also, the touch electrodes COM1 to COMn may each be formed of a transparent conductive material and thus do not reduce an aperture ratio during a display period of pixel array driving.

A common voltage source (not shown) may supply a common voltage Vcom to the touch electrodes COM1 to COMn through the sensing lines S1 to Sn during the pixel array driving period T1. Therefore, the touch electrodes COM1 to COMn may act as the common electrode during the pixel array driving period T1. To this end, the touch electrodes COM1 to COMn may be connected to a selection circuit (not shown), which may be connected to the common voltage source and the touch driving circuit 300.

The touch driving circuit 300 may be disabled during the pixel array driving period T1, and during the touch screen driving period T2, the touch driving circuit 300 may be enabled. Therefore, during only the touch screen driving period T2, the touch driving circuit 300 may simultaneously supply the touch electrode driving signal to the sensing lines S1 to Sn.

Figure 5:
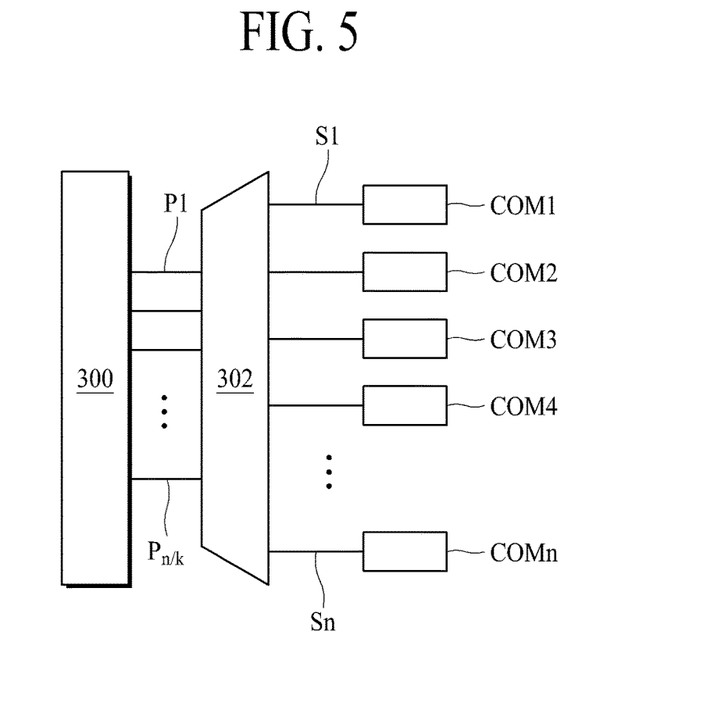
FIG. 5 is a diagram illustrating a modification example of the touch screen illustrated in FIG. 4A.
Figure 6:
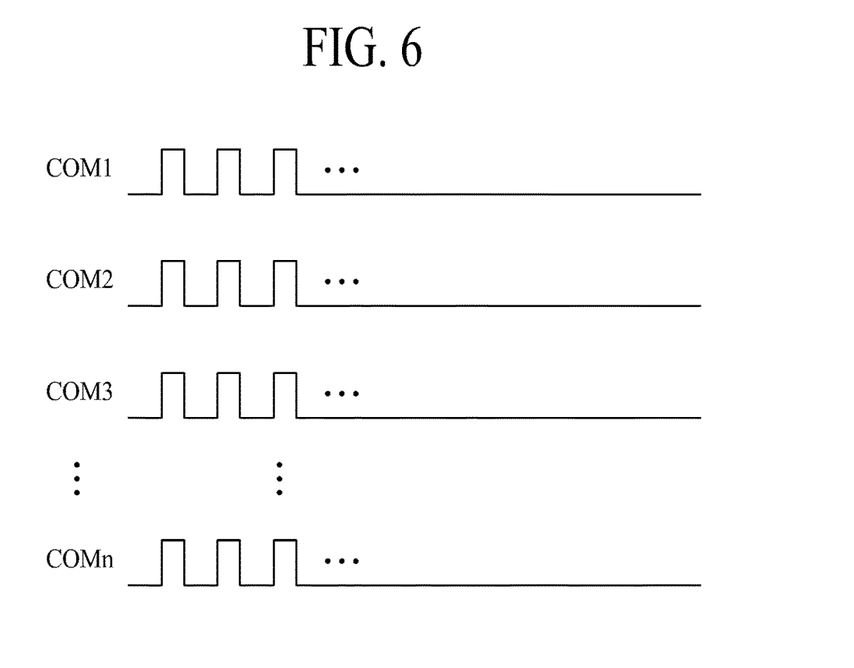
FIG. 6 is a waveform diagram showing a touch electrode driving signal supplied to a touch detection electrode of the touch screen illustrated in FIG. 5.

FIG. 5 is a diagram illustrating a modification example of the touch screen illustrated in FIG. 4A, and FIG. 6 is a waveform diagram showing a touch electrode driving signal supplied to a touch detection electrode of the touch screen illustrated in FIG. 5.

In a self-capacitive touch screen TSP, as illustrated in FIG. 5, in order to reduce the number of signal application lines connected to the touch driving circuit 300, a multiplexer 302 may be further connected to input terminals of the touch electrodes COM1 to COMn, and a signal may be applied to the sensing lines S1 to Sn through time division. The multiplexer 302 may be provided as one or in plurality. For example, if the multiplexer 302 is a 1:k (where k is a natural number which is equal to or larger than two and is smaller than n) multiplexer, the multiplexer 302 may be connected to the touch driving circuit 300 through n/k number of signal application lines. In this case, as illustrated in FIG. 6, the n touch electrodes COM1 to COMn may be grouped in units of k touch electrodes, and k number of touch electrodes may receive k number of time-divided touch electrode driving signals Ts.

Figure 7:
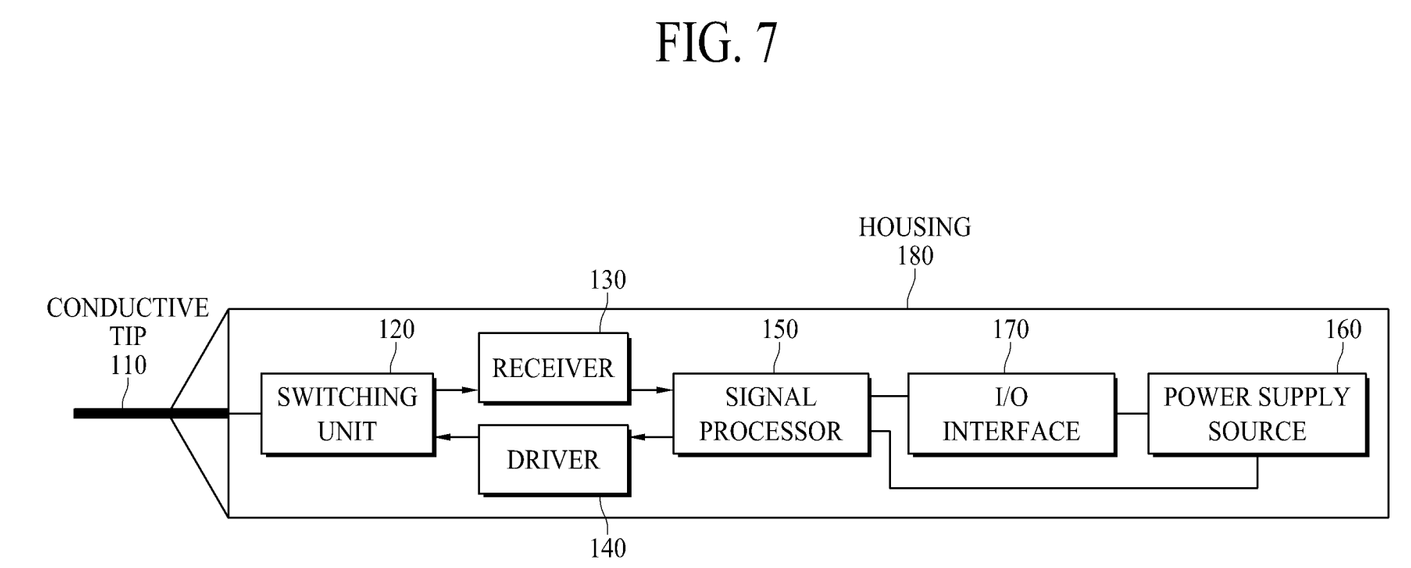
FIG. 7 is a block diagram illustrating an internal structure of a touch pen according to an embodiment of the present invention.

FIG. 7 is a block diagram illustrating an internal structure of a touch pen according to an embodiment of the present invention.

The touch pen used as a touch input device according to an embodiment of the present invention, as illustrated in FIG. 7, may include a housing 180, a conductive tip 110 that protrudes to outside one side of the housing 180, a switching unit 120 that is connected to the conductive tip 110 in the housing 180, a receiver 130 and a driver 140 that are connected to the switching unit 120 in parallel, a signal processor 150 that receives and processes a reception signal from the receiver 130 to perform synchronization, a power supply source 160 that is connected to the signal processor 150 to supply power, and an input/output (I/O) interface 170 that is connected between the signal processor 150 and the power supply source 160.

The conductive tip 110 may be formed of a conductive material such as metal and/or the like and may be time-divided to act as a reception electrode and a transmission electrode. When the conductive tip 110 touches the display panel 200, the conductive tip 110 may be coupled to a touch electrode COMx, which overlaps the conductive tip 110 or is the most adjacent to the touch tip 110, among the touch electrodes included in the touch screen and may receive the touch electrode driving signal from a corresponding touch electrode or may transfer a pen output signal, output from the touch pen, to the touch screen.

For example, in the display panel 200, a polarizer or a passivation layer may be disposed on an uppermost side. The polarizer or the passivation layer may function as an insulation layer to generate a sensing capacitance Csen between the conductive tip 110 and the touch electrode. When the conductive tip 110 touches the display panel 200, the conductive tip 110 may change a value of the sensing capacitance Csen which is constant on a corresponding touch electrode, and the touch driving circuit may read a change in the value of the sensing capacitance Csen to detect a touched position.

When the touch pen 100 touches the display panel 200, the switching unit 120 may be directly and electrically connected to the conductive tip 110, and the conductive tip 110 may determine whether to act as the reception electrode or the transmission electrode.

The receiver 130 may amplify and process a signal received through the conductive tip 110. Here, the signal received from the conductive tip 110 may correspond to the touch electrode driving signal Ts applied to a touch electrode which is provided in an area touched by the touch pen.

In an initial state, the touch pen may be turned on, and then, when the touch pen touches the display panel 200, the conductive tip 110 may be directly connected to the receiver 130 through the switching unit 120. Then, the receiver 130 may amplify the received touch electrode driving signal Ts by using an amplifier included therein to supply the amplified touch electrode driving signal Ts to the signal processor 150.

The signal processor 150 may analyze a signal supplied through the receiver 130 to generate a synchronization signal synchronized with the touch electrode driving signal Ts and may supply the touch electrode driving signal Ts to the driver 140.

The driver 140 may include a level shifter. The driver 140 may generate a pen output signal Ps, which swings between a predetermined high voltage and a predetermined low voltage, in synchronization with the touch electrode driving signal Ts. Also, the driver 140 may supply the generated pen output signal Ps to the conductive tip 110 through the switching unit 120.

The housing 180 may include the power supply source 160 and the I/O interface 170. Turn-on driving of the touch pen 100 may be controlled through the I/O interface 170. The I/O interface 170 may be connected to the power supply source 160 included in the housing 180 to supply necessary power to the receiver 130, the driver 140, and the signal processor 150.

Here, the I/O interface 170 may be electrically connected to the power supply source 160 according to a pressing operation performed by a user, and an operation of the touch pen may be controlled according to the pressing operation.

Figure 8:
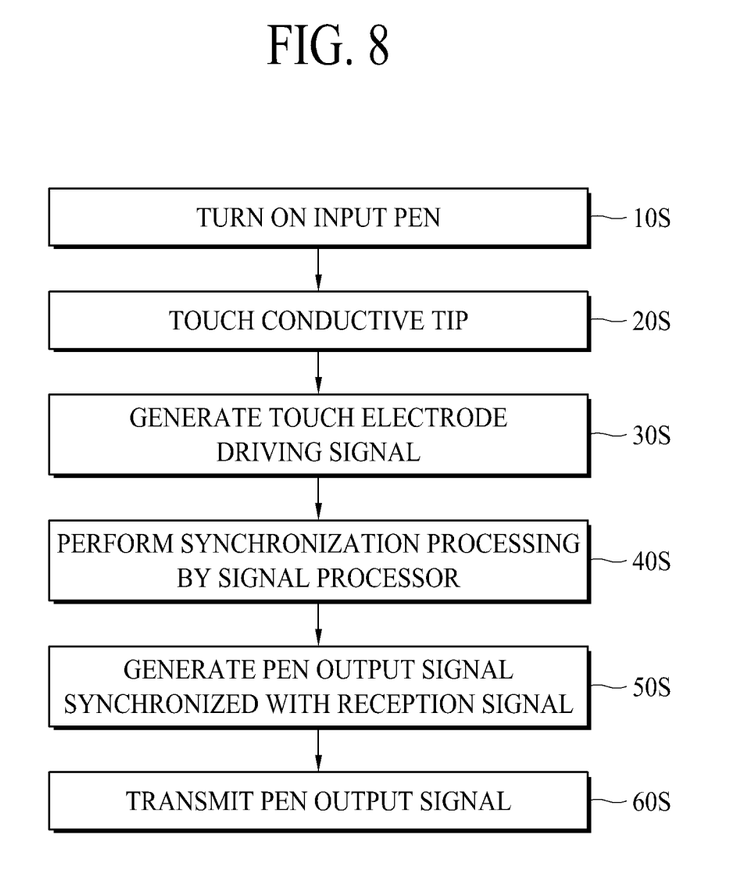
FIG. 8 is a flowchart illustrating an operation of the touch pen according to an embodiment of the present invention.

FIG. 8 is a flowchart illustrating an operation of the touch pen according to an embodiment of the present invention.

First, in operation 10S, the power supply source 160 may supply power to the touch pen 100 through the I/O interface 170.

Subsequently, in operation 20S, the conductive tip 110 may touch a certain portion of the display panel 200.

In operation 30S, the conductive tip 110 may be immediately coupled to the touch electrode included in the display panel 200 at an initial touch time and may sense a touch electrode driving signal received from the touch electrode of the touch screen to transfer the touch electrode driving signal to the receiver 120.

In operation 40S, the receiver 120 may amplify a received signal and may transfer the amplified signal to the signal processor 150, and the signal processor 150 may find a timing synchronized with a signal transferred from the touch electrode. In this case, the signal processor 150 may include a comparator. The comparator may compare a predetermined threshold value with the amplified signal input thereto, and when the threshold value is lower than the amplified signal, the signal processor 150 may determine whether there is a touch.

The signal processor 150 may analyze the signal supplied from the receiver 120 and may set a timing between the received touch electrode driving signal and the pen output signal Ps which is to be transferred. Also, the signal processor 150 may generate a synchronization signal according to a result of the setting and may supply the synchronization signal to the driver 140. An operation of generating the synchronization signal may be performed in, for example, one frame or more periods.

The reason that the one frame or more periods are set for the signal correction is for sufficiently correcting a phase difference between the received touch electrode driving signal Ts of the touch screen and the pen output signal Ps.

All of one frame may not actually be used for a touch operation. The one frame may be divided into the pixel array driving period T1 and the touch screen driving period T2, and during only the touch screen driving period T2, the touch electrode driving signal may be received from the touch screen. Therefore, in signal correction performed by the signal processor 150, the touch electrode driving signal may be sufficiently received in one frame or more periods, and then, a synchronization timing of the pen output signal Ps may be determined.

When a phase error between the touch electrode driving signal Ts and the pen output signal Ps is greater than a default value, a separate correction algorithm may be further executed.

Subsequently, in operation 505, the driver 140 may synchronize the pen output signal Ps having a predetermined frequency and amplitude according to the synchronization signal supplied from the signal processor 150.

Subsequently, in operation 60S, the driver 140 may supply the generated pen output signal Ps to the conductive tip 110 through the switching unit 120.

The touch pen may touch the touch screen after an initial turn-on operation of the touch pen, and then, a switching period may be provided between a reception period Rx of the touch electrode driving signal Ts and a transmission period Tx where the pen output signal Ps is transferred to the touch screen. The switching period may be a period where the signal processor 150 corrects a signal.

In subsequent frames, an operation Tx of transferring through the conductive tip the pen output signal Ps synchronized with the touch electrode driving signal Ts and an operation Rx of receiving a driving signal of the touch screen by using the conductive tip may be repeatedly performed through time division. An initial pen output signal Ps may be synchronized with the touch electrode driving signal Ts, and then, in subsequent frames, a switching period between a reception period Rx and a transmission period Tx of pen driving may be omitted, and driving may be performed by time-dividing the reception period and the transmission period in a touch sensing period.

The touch pen according to an embodiment of the present invention may include at least one button. When a user manipulates the button, the touch pen may adjust the pen output signal to transmit button manipulation information based on button manipulation of the user to the touch screen. Therefore, the present invention may transmit and receive button manipulation information of the touch pen even without a separate wireless communication module being provided in each of the touch pen and the touch screen.

To this end, the signal processor 150 of the touch pen may output a pen output variable signal for adjusting the pen output signal according to button manipulation of the user. Then, the driver 140 of the touch pen may adjust the pen output signal Ps in response to the pen output variable signal.

Hereinafter, embodiments where the driver 140 adjusts the pen output signal Ps according to control by the signal processor 150 will be described in detail.

Figure 9:
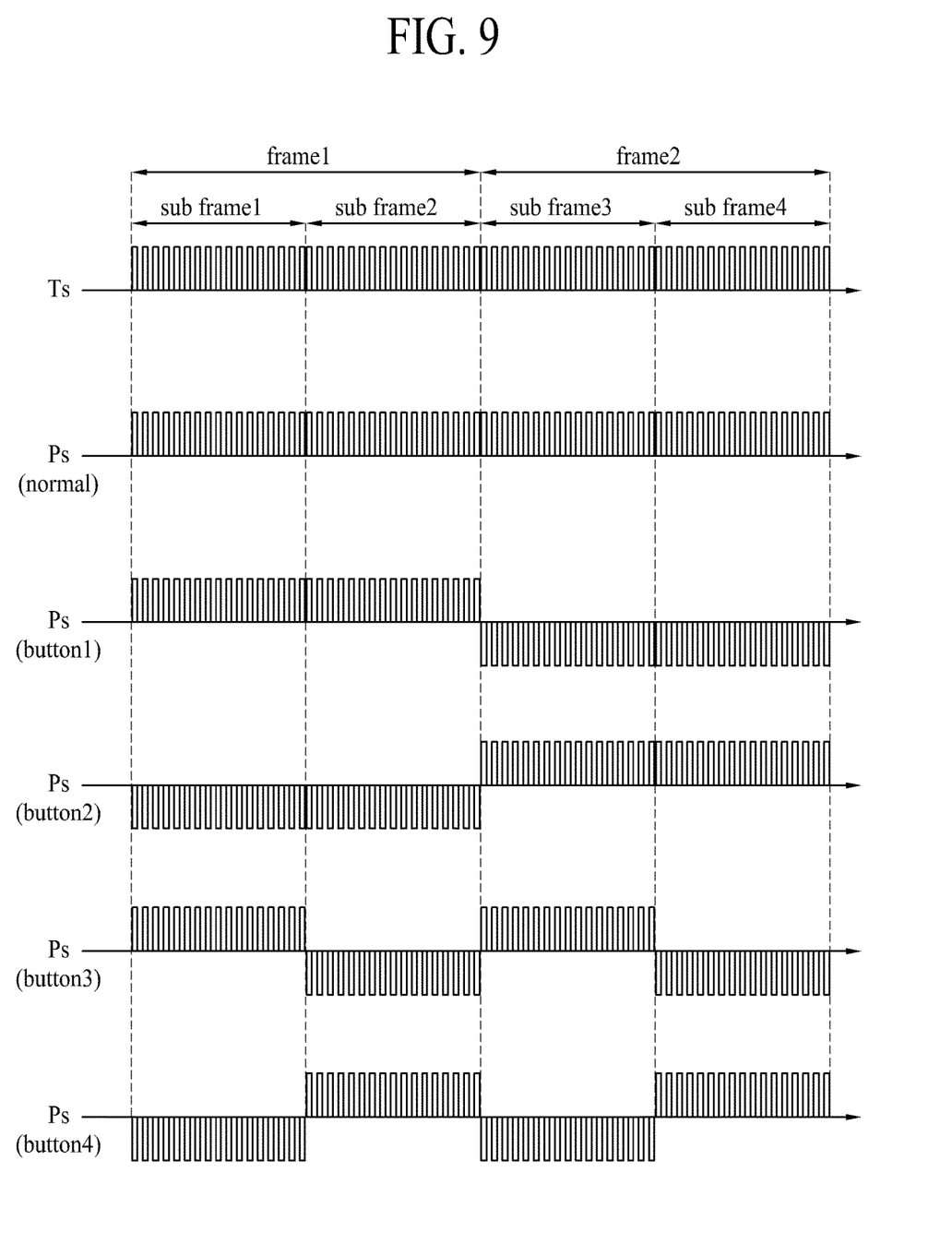
FIG. 9 is a driving waveform diagram showing a touch electrode driving signal, the presence of button manipulation, and a pen output signal based on the kind of a pen, according to a first embodiment of the present invention.
Figure 10:
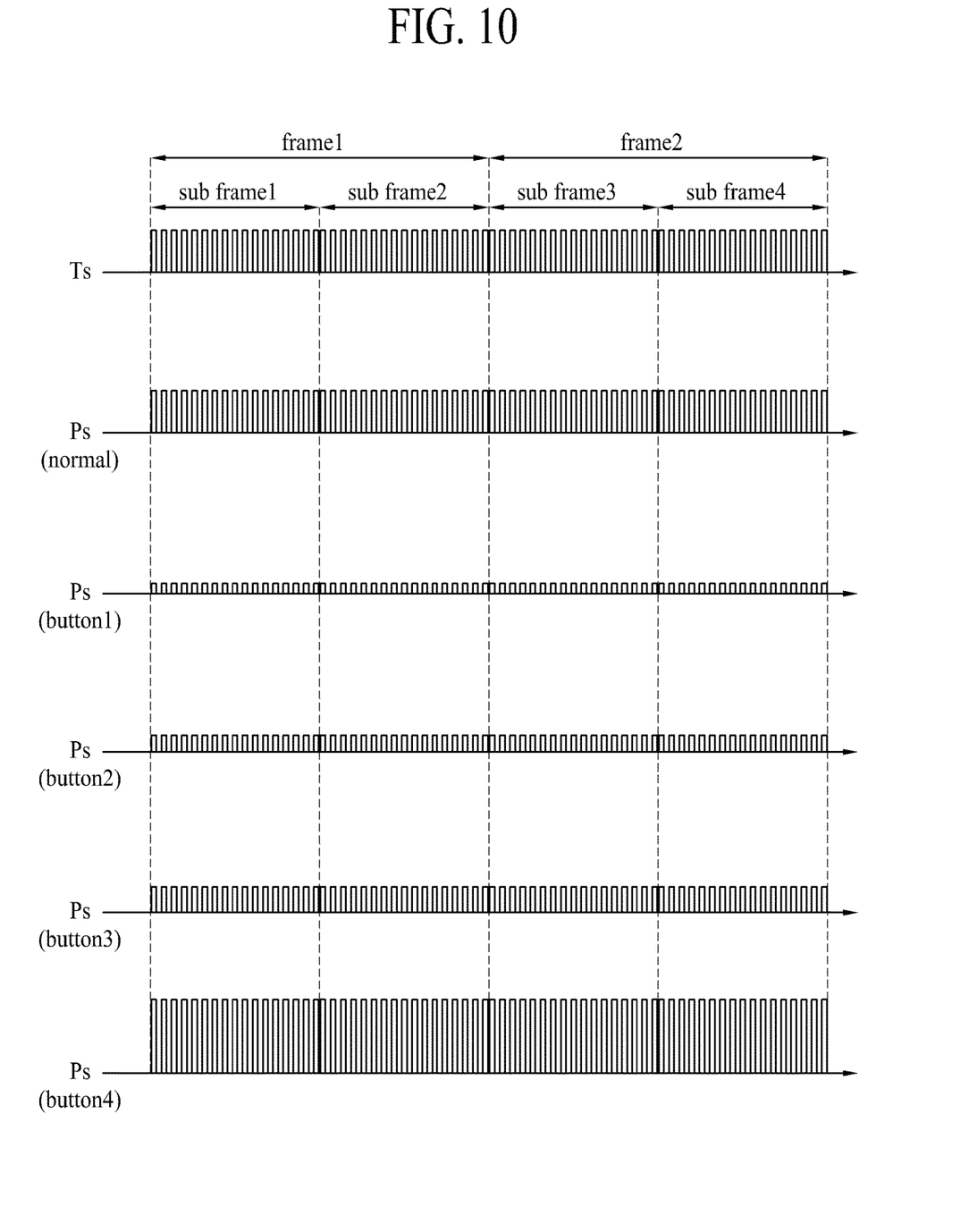
FIG. 10 is a driving waveform diagram showing a touch electrode driving signal, the presence of button manipulation, and a pen output signal based on the kind of a pen, according to a second embodiment of the present invention.
Figure 11:
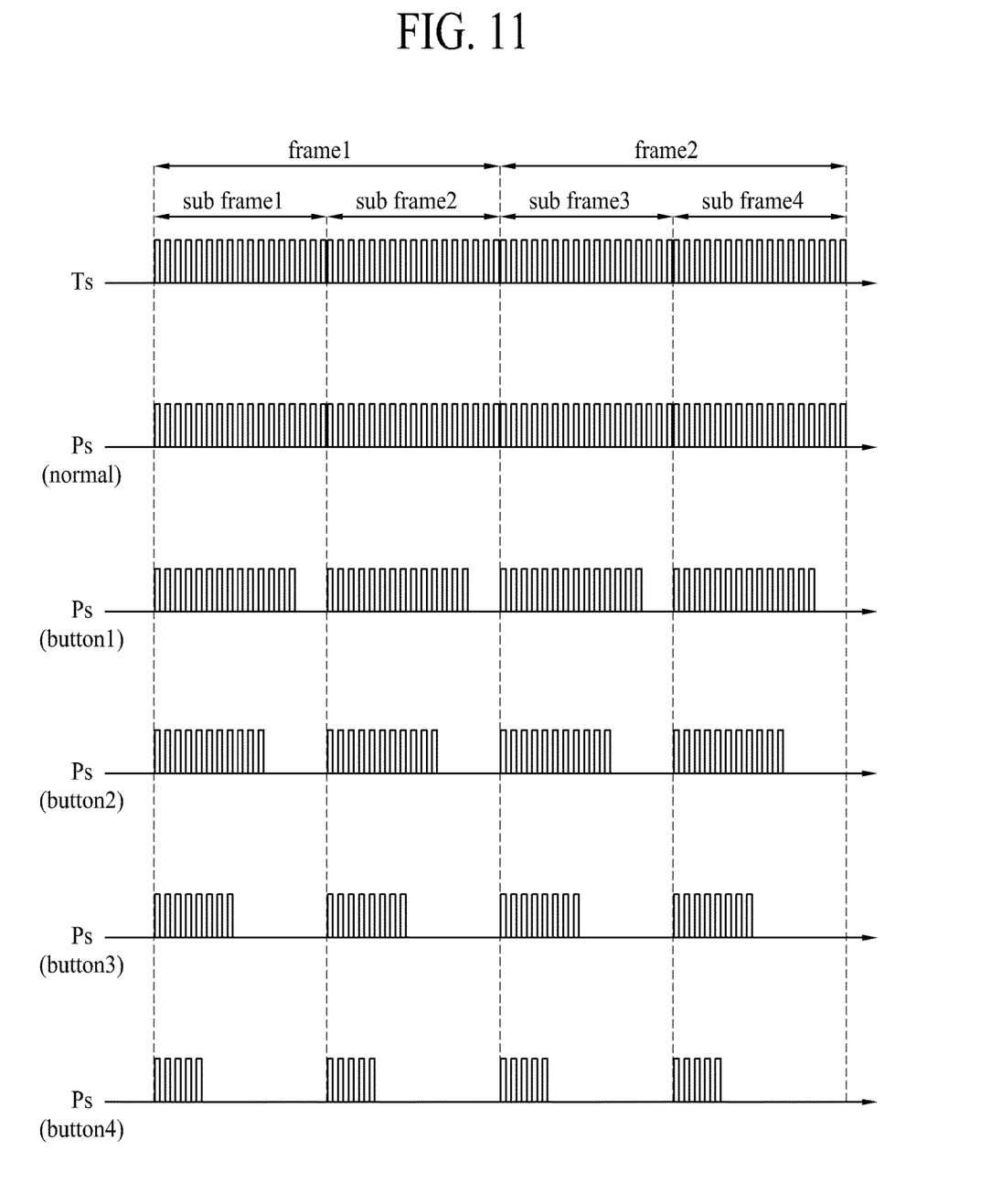
FIG. 11 is a driving waveform diagram showing a touch electrode driving signal, the presence of button manipulation, and a pen output signal based on the kind of a pen, according to a third embodiment of the present invention.

FIG. 9 is a driving waveform diagram showing a touch electrode driving signal Ts, the presence of button manipulation, and a pen output signal based on the kind of a pen, according to a first embodiment of the present invention. FIG. 10 is a driving waveform diagram showing a touch electrode driving signal Ts, the presence of button manipulation, and a pen output signal based on the kind of a pen, according to a second embodiment of the present invention. FIG. 11 is a driving waveform diagram showing a touch electrode driving signal Ts, the presence of button manipulation, and a pen output signal based on the kind of a pen, according to a third embodiment of the present invention.

Referring to FIG. 9, the signal processor 150 of the touch pen according to the first embodiment of the present invention may control the driver 150 to invert a phase of the pen output signal Ps at every specific period when the user manipulates the button.

In detail, the signal processor 150 may output the pen output signal Ps, which consists of a plurality of pulses equal to the number of pulses of the touch electrode driving signal Ts, in a normal state where the user does not manipulate the button. For example, when the user manipulates the button included in the touch pen, the signal processor 150 may sense the button manipulation of the user to invert the phase of the pen output signal Ps at every specific period. In this case, if one frame is divided into a first sub-frame and a second sub-frame, a phase variable period of the pen output signal Ps may be adjusted in units of at least one sub-frame.

When a plurality of buttons are included in the touch pen, the phase variable period of the pen output signal Ps may vary depending on the kinds of the buttons. Also, when one button is included in the touch pen, the touch pen may transmit different commands based on a predefined button manipulation rule. Therefore, the phase variable period of the pen output signal Ps may vary according to predefined button manipulation.

For example, the number of buttons provided in the touch pen may be four. Then, as shown in FIG. 9, the phase of the pen output signal Ps may vary when each of first to fourth buttons is manipulated. Then, the touch screen may sense variation of the phase of the pen output signal Ps to recognize button manipulation information based on button manipulation of the user.

Referring to FIG. 10, the signal processor 150 of the touch pen according to the second embodiment of the present invention may control the driver 150 to invert amplitude of the pen output signal Ps when the user manipulates the button.

In detail, the signal processor 150 may output the pen output signal Ps, which consists of a plurality of pulses equal to the number of pulses of the touch electrode driving signal Ts, in the normal state where the user does not manipulate the button. For example, when the user manipulates the button included in the touch pen, the signal processor 150 may sense the button manipulation of the user to adjust the amplitude of the pen output signal Ps.

When a plurality of buttons are included in the touch pen, the phase variable period of the pen output signal Ps may vary depending on the kinds of the buttons. Also, when one button is included in the touch pen, the touch pen may transmit different commands based on the predefined button manipulation rule. Therefore, the amplitude of the pen output signal Ps may vary according to the predefined button manipulation.

For example, the number of buttons provided in the touch pen may be four. Then, as shown in FIG. 10, the amplitude of the pen output signal Ps may vary when each of the first to fourth buttons is manipulated. Then, the touch screen may sense the variation of the amplitude of the pen output signal Ps to recognize button manipulation information based on button manipulation of the user.

Referring to FIG. 11, the signal processor 150 of the touch pen according to the third embodiment of the present invention may control the driver 150 to adjust the number of pulses constituting the pen output signal Ps when the user manipulates the button.

In detail, the signal processor 150 may output the pen output signal Ps, which consists of a plurality of pulses equal to the number of pulses of the touch electrode driving signal Ts, in the normal state where the user does not manipulate the button. For example, when the user manipulates the button included in the touch pen, the signal processor 150 may sense the button manipulation of the user to adjust the number of the pulses constituting the pen output signal Ps. That is, the signal processor 150 may control the driver 140 to output the pen output signal, which consists of N number of pulses equal to the number of pulses of the touch electrode driving signal, in normal driving where the button is not manipulated. Also, the signal processor 150 may control the driver 140 to output the pen output signal, which consists of M number of pulses different from the N pulses, in button manipulation.

When a plurality of buttons are included in the touch pen, the phase variable period of the pen output signal Ps may vary depending on the kinds of the buttons. Also, when one button is included in the touch pen, the touch pen may transmit different commands based on the predefined button manipulation rule. Therefore, the number of pulses constituting the pen output signal Ps may vary according to the predefined button manipulation.

For example, the number of buttons provided in the touch pen may be four. Then, as shown in FIG. 11, the number of the pulses constituting the pen output signal Ps may vary when each of the first to fourth buttons is manipulated. Then, the touch screen may sense the variation of the number of the pulses constituting the pen output signal Ps to recognize button manipulation information based on button manipulation of the user.

The touch pen according to the embodiments of the present invention is proposed to be applied to a capacitive touch screen device proposed by the applicant. For example, the present invention is proposed in order for an active touch pen to be applied to an in-cell type touch screen device disclosed in Korean Patent Publication Nos. 10-2014-0105216, 10-2014-0085995, and 10-2014-0083214 proposed by the applicant. Therefore, the touch pen according to the embodiments of the present invention may be applied to the touch screen device disclosed in the above-described reference documents.

As described above, according to the embodiments of the present invention, the conductive tip of the touch pen may be used as an element that receives the touch electrode driving signal of the touch screen. Also, the conductive tip may be used as an element that transmits a pen output signal generated in the touch pen. Also, the touch pen may output the pen output signal in synchronization with the touch electrode driving signal of the touch screen which is received by the touch pen.

Therefore, according to the embodiments of the present invention, whether a touch is performed by the touch pen is accurately detected in the driving period of the touch screen, and thus, an accuracy of touch detection increases. Accordingly, it is possible to implement a high-sensitivity input pen. Also, a linearity of touch detection is maintained, and thus, touch performance is enhanced. Also, although a separate electrode for driving the touch pen is not added into the display panel, a high sensation of touch sensing is maintained, and thus, a structure is simplified.

Moreover, according to the embodiments of the present invention, since the button manipulation information based on the touch pen is transmitted even without using a separate wireless communication module, a structure is simple, and the manufacturing cost is reduced.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A touch screen device comprising:
a touch screen including a plurality of touch electrodes;
a touch driving circuit applying a touch electrode driving signal to the plurality of touch electrodes; and
a touch pen receiving the touch electrode driving signal applied to the plurality of touch electrodes and transmitting a pen output signal to the touch screen in synchronization with the received touch electrode driving signal, wherein the touch pen comprises
a conductive tip through which the touch pen receives the touch electrode driving signal and transmits the pen output signal,
a switching circuit electrically connected to the conductive tip, the switching circuit determining whether the conductive tip is configured to act as a reception electrode to receive the touch electrode driving signal applied to the plurality of touch electrodes or to act as a transmission electrode to transmit the pen output signal through the plurality of touch electrodes to the touch screen, and
a plurality of buttons, and when a user manipulates one of the plurality of buttons, the touch pen adjusts the pen output signal to transmit different button manipulation information according to button manipulation of the user,
wherein the touch electrode drive signal is received in one frame or more periods prior to determining a synchronization timing of the pen output signal,
wherein the pen output signal is varied in one or more of phase, amplitude and number of pulses depending on kinds of the buttons, and
wherein the touch driving circuit senses the pen output signal transmitted from the conductive tip of the touch pen through the plurality of touch electrodes to recognize the button manipulation information.

2. The touch screen device of claim 1, wherein the touch pen comprises:
a portion of the conductive tip protruding to one side of a housing;
a receiver amplifying, processing, and outputting the touch electrode driving signal received through the switching unit;
a signal processor analyzing a signal supplied from the receiver to output a synchronization signal, and outputting a pen output variable signal for adjusting the pen output signal according to the button manipulation of the user; and
a driver supplying the pen output signal, synchronized with the touch electrode driving signal, to the switching unit in response to the synchronization signal and adjusting the pen output signal in response to the pen output variable signal.

3. The touch screen device of claim 2, wherein the signal processor controls the driver to invert the phase of the pen output signal at every specific period when the user manipulates the one of the plurality of buttons.

4. The touch screen device of claim 3, wherein the signal processor controls the driver to adjust the specific period according to the kind of the buttons or predefined button manipulation.

5. The touch screen device of claim 2, wherein the signal processor controls the driver to adjust the amplitude of the pen output signal when the user manipulates the one of the plurality of buttons.

6. The touch screen device of claim 5, wherein the signal processor controls the driver to adjust the amplitude according to the kind of the buttons or predefined button manipulation.

7. The touch screen device of claim 2, wherein
the driver generates the pen output signal including N number of pulses in normal driving, and
the signal processor controls the driver to adjust the number of pulses included in the pen output signal when the user manipulates the one of the plurality of buttons.

8. The touch screen device of claim 7, wherein the signal processor controls the driver to generate the pen output signal, including M number of pulses different from the N pulses, according to the kind of the buttons or predefined button manipulation.

9. The touch screen device of claim 2, wherein the signal processor divides one frame into a plurality of sub-frame, and
wherein the phase of the pen output signal inverts in units of at least one sub-frame when the user manipulates the one of the plurality of buttons.

10. A touch pen comprising:
a housing;
a conductive tip, a portion of the conductive tip protruding to one side of the housing;
a switching circuit electrically connected to the conductive tip; and
a plurality of buttons provided the housing,
wherein when a user manipulates one of the plurality of buttons, the touch pen adjusts a pen output signal to transmit different button manipulation information according to button manipulation of the user,
wherein the touch pen receives a touch electrode driving signal applied to the plurality of touch electrodes provided in the touch screen and transmitting the pen output signal to the touch screen through the conductive tip in response to the received touch electrode driving signal,
wherein the touch electrode drive signal is received in one frame or more periods prior to determining a synchronization timing of the pen output signal,
wherein the pen output signal is varied in one or more of phase, amplitude and number of pulses depending on kinds of the buttons and is transmitted to a plurality of touch electrodes of a touch screen through the conductive tip, and
wherein the switching circuit determines whether the conductive tip is configured to act as a reception electrode to receive a touch electrode driving signal applied to the plurality of touch electrodes or to act as a transmission electrode to transmit the pen output signal through the plurality of touch electrodes to the touch screen.

11. The touch pen of claim 10, wherein the touch pen receives a touch electrode driving signal applied to the plurality of touch electrodes provided in the touch screen and transmitting the pen output signal to the touch screen through the conductive tip in response to the received touch electrode driving signal.

12. The touch pen of claim 10, wherein the phase of the pen output signal inverts at every specific period when the user manipulates the one of the plurality of buttons.

13. The touch pen of claim 12, wherein the specific period is adjusted according to the kind of the buttons or predefined button manipulation.

14. The touch pen of claim 10, wherein the amplitude of the pen output signal is adjusted when the user manipulates the one of the plurality of buttons.

15. The touch pen of claim 10, wherein the amplitude of the pen output signal is adjusted according to the kind of the buttons or predefined button manipulation.

16. The touch pen of claim 10, wherein the touch pen further comprises:
 a receiver amplifying, processing, and outputting the touch electrode driving signal received through the switching circuit;
 a signal processor analyzing a signal supplied from the receiver to output a synchronization signal, and outputting a pen output variable signal for adjusting the pen output signal according to the button manipulation of the user; and
 a driver supplying the pen output signal, synchronized with the touch electrode driving signal, to the switching circuit in response to the synchronization signal and adjusting the pen output signal in response to the pen output variable signal.

17. The touch pen of claim 16, wherein
 the driver generates the pen output signal including N number of pulses in normal driving, and
 the signal processor controls the driver to adjust the number of pulses included in the pen output signal when the user manipulates the one of the plurality of buttons.

18. The touch pen of claim 17, wherein the signal processor controls the driver to generate the pen output signal, including M number of pulses different from the N pulses, according to the kind of the buttons or predefined button manipulation.

* * * * *